Dec. 5, 1961    J. R. MEYER    3,011,589
METHOD FOR PRODUCING EXCEPTIONALLY PURE HYDROGEN
Filed March 21, 1960
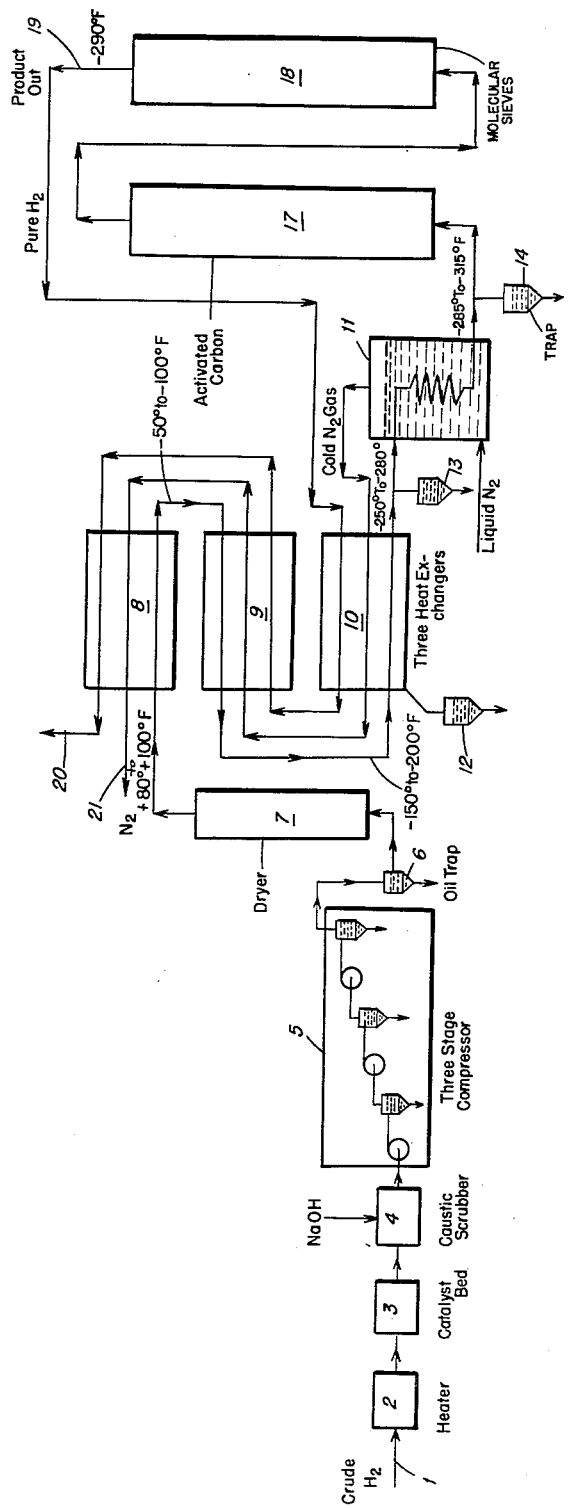

United States Patent Office 3,011,589
Patented Dec. 5, 1961

3,011,589
METHOD FOR PRODUCING EXCEPTIONALLY PURE HYDROGEN
James R. Meyer, Lewiston, N.Y., assignor, by mesne assignments, to Van De Mark Chemical Company, Inc., a corporation of New York
Filed Mar. 21, 1960, Ser. No. 16,373
6 Claims. (Cl. 183—114.2)

This invention relates to a novel and improved process for the preparation and provision of exceptionally pure hydrogen.

Hydrogen of high purity, e.g. 98 mol percent, has heretofore been available in the art and for many purposes has been considered sufficiently pure. Advances in technology have, however, resulted in the need for hydrogen of exceptional purity. Thus, in the manufacture of turbines for aircraft engines and for other purposes, welding is conducted in a hydrogen atmosphere, in which trace impurities such as hydrocarbons and oxygen result in imperfections in the weld which cannot be tolerated. In the food and particularly in the pharmaceutical industries hydrogenation processes require use of hydrogen of exceptional purity in order that the products will not be contaminated. In the manufacture of electronic components, exceptionally pure hydrogen is required to burn out traces of oxygen; any hydrocarbons present in the gas leave deposits which render the products unsuitable for the desired uses. Further, in operations such as production of certain quartzes it is required that the hydrogen employed have less than 75 parts per million total hydrocarbon and less than 10 parts per million carbon monoxide. For such uses, 99.995+ mol percent hydrogen is different in kind from 98 mol percent hydrogen. Production of liquid hydrogen also requires an exceptionally pure gas.

In the above and in a growing number of sophisticated operations, amounts of impurities in hydrogen gas which heretofore have been considered minor cannot be tolerated. Such operations demand hydrogen having a purity of 99.995 mol percent or greater.

Heretofore virtually the only source of hydrogen approaching such purity has been that produced by electrolysis. Electrolytic hydrogen, however, is very expensive and economically unfeasible for many of the applications in which it is useful or necessary. Moreover, electrolytic hydrogen usually contains substantial water vapor, which again may render it unsuitable for use. Furthermore, electrolytically derived hydrogen generally does not have a purity exceeding 99.9 mol percent on the average.

Conventional purification processes may upgrade the purity of hydrogen to about 98 mol percent, but are incapable of providing a purity of the degree possible by the practice of this invention.

The purification of hydrogen-containing gases such as oil refinery waste gas and natural gas presents an even more difficult problem, because of the proportionately smaller amount of hydrogen, and the larger and varied content of other gases. Refinery gas commonly contains saturated and unsaturated hydrocarbons including methane, ethane, propane, butane, pentane, and higher hydrocarbons and butylene, and alcohols such as secondary butanol, ketones such as methylethyl ketone, oxygen, nitrogen, carbon monoxide, hydrogen sulfide, and water.

A variety of purification procedures for such mixtures are available, but no process has yet been described which effectively utilizes these procedural steps to produce hydrogen gas to have a purity of 99.995 mol percent hydrogen or greater. Activated carbon, condensation of the gases to low temperatures, liquid absorbers, silica gel, and molecular sieves, the term commonly used in the art to refer to crystalline zeolite adsorbent material, all could be employed, but none have yet been combined in a way which would produce hydrogen of such purity by a simple and inexpensive process which would be useful commercially to produce substantially pure hydrogen at a reasonable cost.

Activated carbon, silica gel and extraction and condensation procedures may be dismissed at once as inherently incapable of stripping hydrogen of a sufficient proportion of impurities to produce hydrogen of 99.995 mol percent and greater purity. Molecular sieves present a special problem when, as in the present case, it is desired to remove a variety of other gases from a stream of gas. These materials adsorb other molecules as does a sponge, and it is well accepted that the size of the pores in the sieve determines what molecules are adsorbed. However, the selective adsorption of certain molecules from mixtures thereof with others introduces a complexity to the problem. It is quite difficult to predict under what circumstances certain molecules in the mixture will be adsorbed by a sieve to the exclusion of others. While it has been shown that some molecules enter the crystals more readily at low temperatures, adsorption is not in all cases proportionately increased as temperature drops. Nitrogen, for example, shows an increasing rate of adsorption down to $-120°$ C. ($-184°$ F.) but then adsorption decreases again. Oxygen, on the other hand, is freely adsorbed even down to $-200°$ C. ($-328°$ F.). The behavior of other molecules at various temperatures has been investigated and reported, for example, in U.S. Patent No. 2,882,244.

Clearly, a factor in the adsorption of molecules from mixtures is the attraction that the sieve crystal has for the molecules in question. Certain types of gas molecules may fill the pores first, because they are preferentially adsorbed. If this occurs for only one gas, only it would be removed from a mixture of two or more. To remove two or more gases and leave only one is a far more difficult problem because it requires that two or more gases be adsorbed simultaneously to the exclusion of one.

Obviously, the proportions of the gases in the mixture are also a factor to be taken into account. If a gas is preferentially adsorbed, but is present in such small quantities that its adsorption first cannot fill the sieve, preference for this gas will not permit adsorption of the gases less preferentially adsorbed.

Furthermore, the molecular sieves have only a limited amount of volume available for adsorption, which means that the proportions the impurities capable of being removed from a mixture may have to be adjusted, so as to ensure substantially complete adsorption of such impurities, and the obtention of the desired final product of high purity.

The pressure of the gases also may be significant in determining the adsorbability of certain impurities, which may be present in such small amounts as not to be adsorbable at pressures below a certain minimum.

A good theoretical discussion of the nature of the adsorption by molecular sieves and of the problems presented thereby will be found in the article by Breck and Smith, Scientific American, January 1959, pages 1 to 7.

In accordance with the invention, a process is provided for producing hydrogen of 99.995 mol percent purity using a combination of purification steps and, in at least one stage, preferably the last stage of the purification, passing the hydrogen-containing gases over crystalline zeolite adsorbent material at a temperature below $-285°$ F. and at a pressure above 2000 p.s.i.g.

When the crude hydrogen feed gas is a refinery off-gas or the like containing a substantial number of impurities as hereinbefore described, additional purification steps are employed in combination with those just noted. The gas is scrubbed with caustic to remove $CO_2$, oxygen is removed b catalysis and methane content is reduced by passing the gas through a bed of activated carbon. All of these steps precede the step of contacting the gas with the molecular sieves at a temperature below $-285°$ F. and a pressure above 2000 p.s.i.g, as above described.

Synthetic sodium and calcium alumino silicates, or molecular sieves, are classified by the art according to their crystalline structure as type A and type X. The properties, characteristics, and method of preparation of type A are fully set forth in U.S. Patent 2,882,243; type X is fully described in U.S. Patent 2,882,244. Molecular sieves are available as standardized commercial items from the Linde Company and are sold according to type and effective pore diameter (expressed in angstrom units). Thus type 5A is understood by the art to mean molecular sieves of type A crystalline structure having an effective pore diameter of 5 angstrom units. Particular characteristics of the various types may be readily ascertained by reference to the two patents cited and to the abundant literature, much of which is published by the Linde Company. Other publications include an article in J.A.C.S. 78:5963.

I have found that when hydrogen containing small amounts of mixtures of impurities such as methane, carbon monoxide and nitrogen, and perhaps trace amounts of other hydrocarbons, is passed through a bed of molecular sieves at a temperature below $-285°$ F. and preferably about $-315°$ F. and a pressure above 2000 p.s.i.g., preferably about 2500 p.s.i.g, the molecules other than hydrogen are selectively adsorbed and the product hydrogen contains less than 10 p.p.m. impurities. The impurities may initially be present in very small concentration, representatively 0.05% $CH_4$, 0.03% CO, and 0.03% $N_2$.

While on stream, the molecular sieves, although gradually becoming more contaminated with impurities, nevertheless continue to provide a product of substantially constant purity—less than about 10 p.p.m. impurities, under the conditions described herein. Finally, however, the capacity of the sieves becomes exhausted, and the purity of the product gas rapidly increases to levels which are intolerable for the purposes of this invention. Under the process conditions I have described, about one million cubic feet of product hydrogen (S.T.P.) having a purity of 99.995 mol percent or greater may be obtained with 1000 pounds of molecular sieves.

If, however, temperature is raised materially above $-285°$ F., the period during which a particular batch of molecular sieves can remain on stream, continuing to produce hydrogen of a purity of at least 99.995 mol percent, is sharply reduced. I have found that the concentration in particular of nitrogen in the product soon begins to rise markedly, and other impurities also are adsorbed to a lesser extent. Thus at $-215°$ F. the useful life of a given tower of molecular sieves will be cut roughly in half. I have further found that lowering temperature below about $-315°$ F. does not afford any substantial further advantage, although such lower temperatures may be employed and are comprehended within the scope of my invention.

Of at least equal criticality is the pressure in excess of 2000 p.s.i.g. Reducing the pressure causes the partial pressure of the impurities to drop and thus impairs the efficacy of the sieves in removing them. Moreover, the decrease in pressure causes a lesser amount of impurities to be removed by condensation during cooling. This is particularly disadvantageous where methane is an impurity. Thus a pressure drop both increases the number of pounds of impurities to be removed by the sieves and also reduces their capacity to hold adsorbed material. The combined effect becomes apparent quite rapidly; at 1800 p.s.i.g. the useful life of the sieves falls to about 50% of their life at 2500 p.s.i.g. I have further found that a pressure above about 2500 p.s.i.g. does not provide a correspondingly significant advantage in terms of process and has the disadvantage of requiring special equipment capable of withstanding such unusually high pressure.

I have found that the combination of temperature and pressure hereinbefore set out is essential to a useful process for producing hydrogen gas of exceptional purity. My process, which permits some one million cubic feet of pure gas to be obtained from a given tower of sieves, is obviously different in kind from one capable of producing only a small fraction of that output from the same quantity of sieves.

Molecular sieves as a group are suitable for use in the practice of the process of this invention, and it is within the skill of the art to select appropriate or preferred zeolitic materials. Both type A and type X may be used, and both the sodium and the calcium types are suitable. I have found that type 4A, a sodium zeolite having an effective pore diameter of 4 angstrom units and a type A crystal structure is suitable, as well as type 13X, a sodium zeolite having an effective pore diameter of 13 angstrom units and type X crystal structure. Type 13X is preferred for use in drying the crude gas, where such a process feature is included. Type 5A, a calcium zeolite of the type A crystal structure and having an effective pore diameter of 5 angstrom units, is preferred for use in the final adsorber bed because of its greater adsorbing capacity. The method of preparing these individual materials and their properties is fully set forth in U.S. Patents 2,882,243 and 2,882,244, hereinbefore mentioned.

Initial purification steps may be employed to remove substantial amounts of impurities peculiar to a particular feed gas and to accomplish crude purification. Thus a methane-rich feed gas may conveniently be passed through a bed of activated carbon to reduce the concentration of methane. Omission of such initial purification would tend to reduce the efficiency of the essential purification process by causing the zeolite material to become saturated with methane before its usefulness in extracting other impurities has been fully utilized. Thus while desirable in the interest of economy and efficiency, initial purification is not essential to operation of the process of this invention.

The manner of practicing the process of this invention and certain optional steps which may be associated therewith may be ascertained by reference to the accompanying drawing and the description which follows.

The impure or crude hydrogen feed enters the system at inlet 1, passes through heater 2, deoxidizing catalyst bed 3, and caustic scrubber 4. The catalyst bed 3 may comprise any of the usual catalysts for oxygen removal, such as palladium, which removes the oxygen by causing it to combine with hydrogen. The $CO_2$ in the feed is effectively removed by the caustic scrubber 4.

After initial purification, the gas passes through compressor 5, which may be a multi-stage unit, which compresses the gas to above 2000 p.s.i.g., suitably 2500 p.s.i.g. The compressed gas may conveniently be cooled to near ambient temperature by any conventional means. Higher molecular weight hydrocarbon impurities and water are liquefied in compression and may be removed through traps 15 located after the stages of the compressor. If desired, the gas may then be passed through an oil trap 6 which may comprise a bed of any of the common adsorbents such as silica gel.

The compressed gas then enters dryer 7, which comprises a bed of activated carbon and crystalline zeolite adsorbent material commonly referred to as molecular sieves (preferably type 13X) operating at ambient temperatures. The dryer preferentially removes residual water and higher boiling hydrocarbons such as alcohols and ketones from the gas and materially reduces their concentration therein. The drying step or its equivalent is particularly convenient prior to the immediately following step of cooling the gas, because it removes impurities, such as water, which would otherwise condense and solidify in the heat exchanger passages during cooling and thus impair or prevent flow through the cooler. The drying step may be equivalently but less conveniently accomplished by regulating the temperature gradient in the cooling step of the process and providing frequently spaced condensate traps for progressive removal of liquid impurities prior to their solidification.

Following the dryer, the gas passes through a plurality of heat exchangers 8, 9 and 10, where the various hydrocarbon impurities condense as the temperature is progressively reduced. The condensed hydrocarbons are collected in traps 12 and 13 positioned after the exchangers. The cooling media in these exchangers are the cold, pure product hydrogen gas leaving the adsorber and, supplementing the pure hydrogen, cold nitrogen from tank 11 of boiling liquid nitrogen. The cold hydrogen and nitrogen streams, which are never permitted to become contaminated with other gases, are cycled individually through heat exchangers 10, 9 and 8. The pure hydrogen gas, by now warm, leaves at outlet 20 and is conveniently stored in tanks. Warmed nitrogen leaves exchanger 8 at outlet 21 and is economically converted to liquid from and recycled to tank 11.

I have found that the number of impurities is more significant than their concentration by reason of the number of condensation and freezing points involved. Thus adjustment of the temperature gradient and flow rates of refrigerant and feed gas, easily accomplished by regulation of valves in the lines, is appropriate for feeds having varying amounts of impurities. The temperature gradient should be adjusted so that none of the condensed impurities freezes before leaving the particular exchanger and being removed in the trap following it.

The number of exchangers employed is also related to the number of impurities in the feed gas. For a substantially pure feed, only one heat exchanger may be required. Where the number of impurities is greater, however, a plurality of exchangers is required in order to provide the necessary temperature gradient and number of traps to remove condensate. It has been found that three heat exchangers (not including the tank of liquid nitrogen discussed below) are sufficient for ordinary refinery waste gases if initial purification steps, such as dryer 7, are employed. Omission of initial purification may, however, necessitate use of additional heat exchangers. The progressive cooling of the feed gas, as by use of the heat exchangers, is an essential step of the present process.

In one embodiment of the present process the partially purified and compressed gas enters the first heat exchanger at about ambient temperature and is cooled to between −50° and −100° F. After leaving the second exchanger its temperature is between −150° and −200° F., and after the third, −250° to −280° F. The number of exchangers employed is a matter of convenience, determined in part by their capacity and efficiency as well as by the number of impurities in the feed. It has been found advantageous to employ heat exchangers having small conduit tubes preferably of a highly heat-conductive metal such as copper. Any plugging of the tubes can be remedied by use of appropriate low-freezing solvents or by providing heat to the plugged area.

After leaving the heat exchangers the partially purified gas passes through a coil located in a tank of liquid nitrogen 11 which serves to bring the temperature below about −285°, suitably −315° F. Impurities removed by condensation are collected in trap 14. Unlike certain prior art processes, the present process does not physically contact the gas with the liquid nitrogen as by counter-current flow, and an increase in the nitrogen content of the gas is thereby advantageously avoided. Tank 11 may conveniently serve as a reservoir for the nitrogen coolant supplied to the heat exchangers.

At −300° F. only $CH_4$, CO, $N_2$ and perhaps trace amounts of lower hydrocarbons remain in the hydrogen. These impurities are removed by passing the cold gas through a bed of molecular sieves 18. A bed of activated carbon 17 is provided ahead of the molecular sieves to remove in part methane which may be present. The molecular sieves which comprise the bed 18 are preferably type 5A, which provides a greater capacity, but type 4A or type 13X may satisfactorily be used. The sieves remove substantially all the remaining impurities and the gas issuing from bed 18 is 99.995+ mol percent hydrogen.

The invention accordingly resides in the combination of pressure, temperature, and use of molecular sieves, no element or combination thereof less than the whole being effective to accomplish the novel, useful and unexpected result of this invention.

It will further be apparent that the process as described in conjunction with the drawing may omit certain steps such as the oil trap 6, the dryer 7, the activated carbon bed 17, the heater 2 and the catalytic oxidation bed 3, and the caustic scrubber 4. These are merely conveniences to effect ancillary purifications and to render the subsequent purification steps more efficient.

Efficiency is further increased if the low-temperature operations are well insulated. It has been found that the higher cost of vacuum insulation and use of colloidal silica insulation are justified in view of the savings they make possible.

The following examples are intended to illustrate the present invention and are not to be taken in a limiting sense.

*Example 1*

The process of this invention is employed to purify hydrogen gas containing a number of impurities. The crude hydrogen is derived from refinery off-gas and has the following analysis.

| Component: | Mol percent |
|---|---|
| Hydrogen | 99.30 |
| Methylethyl ketone | 0.06 |
| Sec. butanol | 0.25 |
| Water | Saturated |
| Carbon dioxide | 0.006 |
| Oxygen | 0.01 |
| Nitrogen | 0.03 |
| Carbon monoxide | 0.03 |
| $C_1$–$C_4$ and up | 0.314 |

The gas enters the plant at 5–30 p.s.i.g. and 80° to 100° F. and passes through a bed of palladium catalyst for catalytic deoxidation and through a caustic scrubber to remove $CO_2$. The gas is then compressed to 2250 p.s.i.g. in a three-stage compressor, water and higher hydrocarbons being removed through traps between the compressors. The gas is passed through an adsorbent bed of silica gel to remove oil and then into a three-bed unit of activated carbon and type 13X molecular sieves. The sieve beds operate at ambient temperatures and may be reactivated at 300° to 400° F. These beds remove residual water and ketones, alcohols, and other higher hydrocarbons or reduce their concentration to a level which will avoid plugging the conduits in the low temperature equipment.

The gas then passes into a series of three heat exchangers which are cooled by separate counter-current flows of product hydrogen and nitrogen, which enters the final exchanger at a temperature of about −285° F. Traps are located after each exchanger to permit removal of condensed hydrocarbons. Depending upon the composition of the feed gas the temperature gradient may be adjusted by regulation of the amount of liquid nitrogen refrigerant and the rate of flow of hydrogen gas in order to insure that each trap removes as a liquid all impurities which might subsequently freeze in the next exchanger. The temperature of the gas is −75° F. following the first exchanger, −185° F. following the second exchanger, and −285° F. following the third exchanger.

The gas from the third exchanger is fed through a coil immersed in a tank of liquid nitrogen and emerges at a temperature of −300° F., condensed impurities being removed in a trap. At this point the hydrogen still contains methane, carbon monoxide and nitrogen plus trace quantities of various impurities, predominately lower saturated hydrocarbons.

The gas is then passed over activated carbon for methane removal and then through a tower containing type 5A molecular sieves, which remove carbon monoxide, nitrogen, and substantially all the trace impurities. The final hydrogen analysis showed less than 10 p.p.m. total impurities.

The bed of molecular sieves is reactivated when analysis shows the concentration of impurities in the product hydrogen gas to be at the level of tolerance, which for many commercial applications has been found to be about 50 p.p.m. An alternate bed may be kept in reserve for use while the exhausted bed is being reactivated, suitably by heating to about 100° F. while passing a stream of hydrogen through the bed.

*Example II*

The process of the present invention is employed to process a low-purity crude refinery gas having the following composition:

| Component: | Mol percent |
|---|---|
| Hydrogen | 70.2 |
| Carbon dioxide | 0.1 |
| Hydrogen sulfide | 0.1 |
| Oxygen | 0.2 |
| Nitrogen | 0.3 |
| Carbon monoxide | 0.1 |
| Methane | 12.0 |
| Ethane | 9.0 |
| Propane | 5.0 |
| Butane | 1.2 |
| Butylene | 1.0 |
| Pentane | 0.8 |

In order to conduct the process efficiently and economically a series of initial purifications are conducted by scrubbing the gas with heptane or carbon tetrachloride. Alternatively the bulk of hydrocarbons may be removed by passing the crude gas through a bed of activated carbon followed by a bed of molecular sieves, suitably type 13X, in ambient temperature adsorbers. Either initial purification yields a gas having a composition roughly equivalent to that of Example I or of somewhat lower purity and the purification process set forth in Example I may then be followed to obtain hydrogen having a concentration of impurities of less than 10 p.p.m.

*Example III*

The process of this invention is employed to purify a hydrogen gas which is a by-product from a chlorine plant. The gas has the following composition:

| Component: | Mol percent |
|---|---|
| Hydrogen | 99.4 |
| Oxygen | 0.1 |
| Water | Saturated |
| Nitrogen | 0.4 |

The high initial purity of this gas and the absence of hydrocarbon impurities make unnecessary initial purification involving the caustic scrubber, oil trap and activated carbon bed. Further, the traps associated with the heat exchangers do not receive any condensed impurities.

The process conditions are suitably as described in Example I. The catalyst bed serves to remove the oxygen. Part of the water condenses out during the compression step and the remainder is eliminated by the dryer. Nitrogen is removed in the molecular sieve adsorbing tower.

Analysis of the product discloses 3 p.p.m. nitrogen as the only impurity. The product is substantially 100% hydrogen.

It is to be emphasized that even when working with a feed gas having the very high purity of that processed in Example III, the combination of each of the three steps of compression and cooling, with the ranges indicated, and passage of the compressed and cooled gas through a bed of molecular sieves is essential to obtaining a product of exceptionally high purity.

I claim:

1. A method for the purification of impure hydrogen gas containing impurities including one or more members of the group consisting of carbon monoxide, nitrogen, and methane which comprises passing said impure gas at a temperature below about −285° F. and at a pressure above 2000 p.s.i.g. through a bed of crystalline zeolite adsorbent material, whereby the impurities are substantially removed and the purity of the purified gas is at least 99.995 mol percent hydrogen.

2. The method of claim 1 in which the crystalline zeolite adsorbent material is selected from the group consisting of type 4A, type 5A, and type 13X.

3. A method for the purification of impure hydrogen gas containing impurities including one or more members of the group consisting of carbon monoxide, nitrogen and lower hydrocarbons, which comprises the steps of compressing the impure gas to a pressure above 2000 p.s.i.g. and cooling said compressed gas to a temperature below about −285° F., whereby impurities are condensed, and passing said compressed and cooled gas through a bed of crystalline zeolite adsorbent material, whereby gaseous impurities remaining after compression and cooling are removed and hydrogen gas having a purity in excess of 99.995 mol percent is obtained.

4. The method of claim 3, wherein the crystalline zeolite adsorbent material is a member of the group consisting of type 4A, type 5A and type 13X.

5. A method for reducing the hydrocarbon content of hydrocarbon-contaminated hydrogen gas below about 10 parts per million, which comprises compressing the impure gas to a pressure of about 2500 p.s.i.g. and removing condensate resulting from compression, cooling the compressed gas to a temperature of about −300° F. and removing condensate resulting from cooling, and passing the compressed and cooled gas through crystalline zeolite adsorbent material.

6. A method for reducing the impurities content of substantially pure hydrogen gas, containing a minor amount of nitrogen, below 10 parts per million, which comprises passing said substantially pure hydrogen gas at a temperature of about −300° F. and a pressure of about 2500 p.s.i.g. through a bed of crystalline zeolite adsorbent material.

References Cited in the file of this patent

UNITED STATES PATENTS

| 2,224,227 | Keith et al. | Dec. 10, 1940 |
| 2,882,244 | Milton | Apr. 14, 1959 |